United States Patent [19]
Hill

[11] Patent Number: 5,911,473
[45] Date of Patent: Jun. 15, 1999

[54] BICYCLE SADDLE

[76] Inventor: James D. Hill, 1918 S. Lincoln St., Mount Pleasant, Mich. 48858

[21] Appl. No.: 09/015,405

[22] Filed: Jan. 29, 1998

[51] Int. Cl.[6] ........................................................ B60N 2/38
[52] U.S. Cl. ..................... 297/195.1; 297/205; 297/208; 297/215
[58] Field of Search ................................ 297/195.1, 205, 297/206, 208, 212, 215

[56] References Cited

U.S. PATENT DOCUMENTS

| 385,606 | 7/1888 | Fish | 297/205 |
|---|---|---|---|
| 4,062,585 | 12/1977 | Herring, Jr. | 297/195.1 |
| 5,308,140 | 5/1994 | Yu . | |
| 5,544,936 | 8/1996 | Bigolin . | |

FOREIGN PATENT DOCUMENTS

| 820296 | 11/1937 | France . | |
|---|---|---|---|
| 1088577 | 3/1955 | France . | |
| 73553 | 10/1892 | Germany | 297/215 |
| 15725 | of 1895 | United Kingdom . | |
| 29430 | of 1897 | United Kingdom | 297/208 |
| 14702 | of 1899 | United Kingdom | 297/195.1 |

*Primary Examiner*—Laurie K. Cranmer
*Attorney, Agent, or Firm*—Stephen R. Greiner

[57] ABSTRACT

A shock-absorbing bicycle saddle including a resilient seat for engaging the crotch portion of a user and a frame for attaching the seat to a conventional, seat post of a bicycle. The frame has a support bracket formed from stiff wire. One end of the support bracket is secured by a shock dampener to the seat and the other end thereof is secured by another shock dampener to a seat post attachment bracket. Each of the shock dampeners includes a number of cushioning blocks adapted to receive therein one of the opposed ends of the support bracket. In an alternative embodiment of the saddle, the shock dampener adjacent the seat post attachment bracket is replaced by a pair of coiled loops integrally formed with the support bracket.

16 Claims, 2 Drawing Sheets

BICYCLE SADDLE

FIELD OF THE INVENTION

The present invention relates generally to chairs and seats and, more particularly, to straddle-type bicycle saddles.

BACKGROUND OF THE INVENTION

The tilt of a bicycle saddle is crucial to the comfort and efficiency of a rider. If the front of a saddle is set too high relative to the rear of the saddle, for example, a pinched nerve in the crotch of the rider can result. On the other hand, if the front of a saddle is placed too low relative to its rear, a rider may slide forward and have difficulty retaining his body over the peddles for steady power delivery. Thus, a substantially horizontal saddle orientation is preferred by most bicycle riders.

Many bicycle saddles are provided with front and rear springs to absorb road shocks during use. Unfortunately, these springs tend to cause the front and rear ends of the shock absorbing saddles to oscillate up and down. The outcome of these oscillations is often both pinched nerves and reduced peddling efficiency for a rider.

SUMMARY OF THE INVENTION

In light of the problems associated with the known bicycle saddles, it is a principal object of the invention to provide a bicycle saddle that will absorb road shocks without oscillation and without deviating from a preselected inclination during use.

It is another object of the invention to provide a bicycle saddle of the type described whose ability to absorb road shocks may be adjusted to suit the weight and comfort level of any user.

It is an object of the invention to provide improved elements and arrangements thereof in a bicycle saddle for the purposes described which is lightweight in construction, compact in size, inexpensive in manufacture, and dependable in use.

Briefly, the bicycle saddle in accordance with this invention achieves the intended objects by featuring a shock dampener secured to a seat and having a number of cushioning blocks formed of rubber or like material. Each of the cushioning blocks has a passageway oriented in a substantially horizontal plane. The front end of a support member is secured within the passageways. Either a second shock dampener having cushioning blocks or a pair of coiled loops is employed in attaching the rear end of the support member to a conventional, bicycle seat post.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENTS

Figure 1:
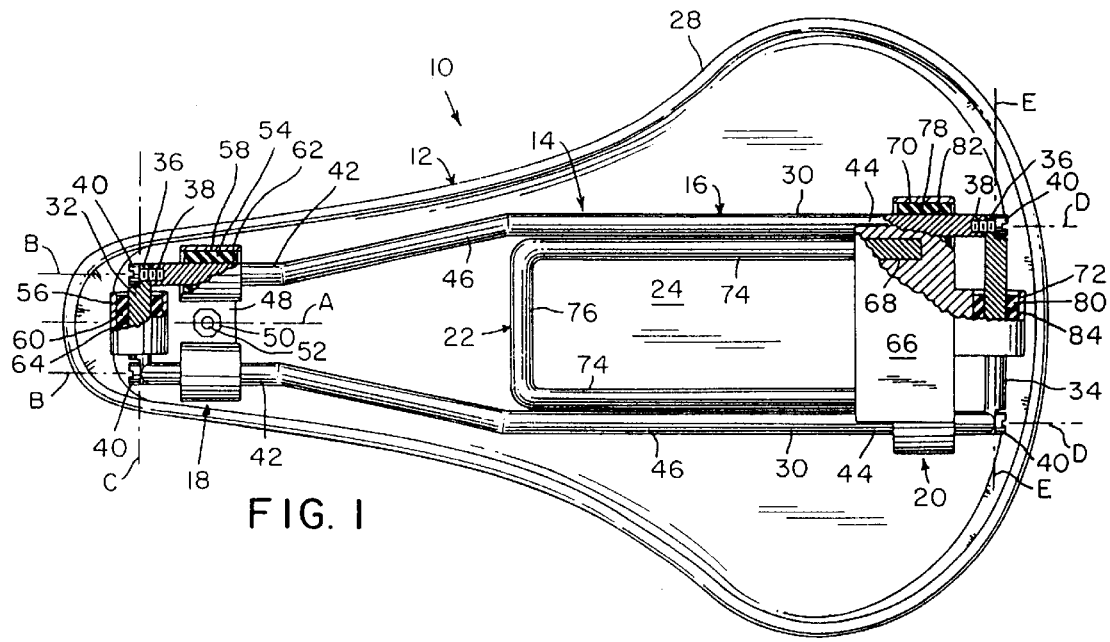
FIG. 1 is a bottom view of a bicycle saddle in accordance with the present invention.
Figure 2:
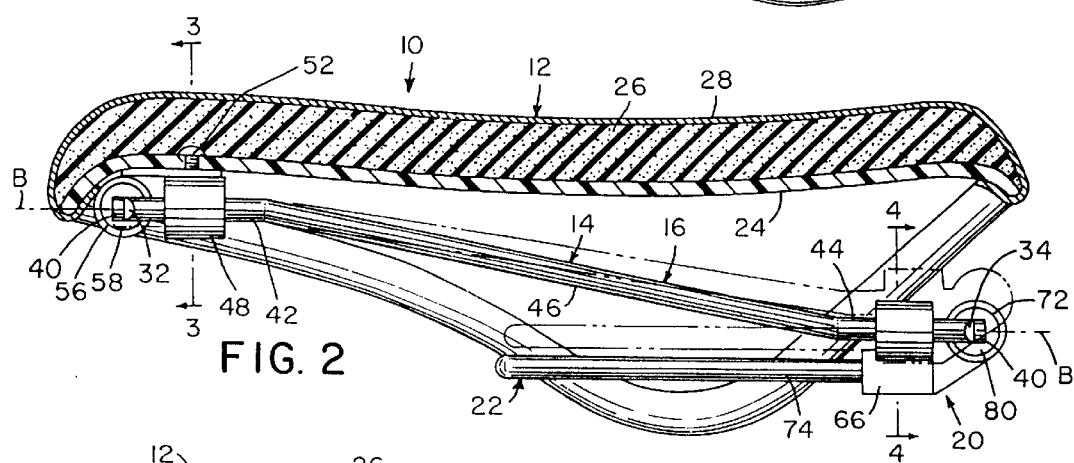
FIG 2 is a side view of the bicycle saddle of FIG. 1 with portions broken away to reveal details thereof.
Figure 3:
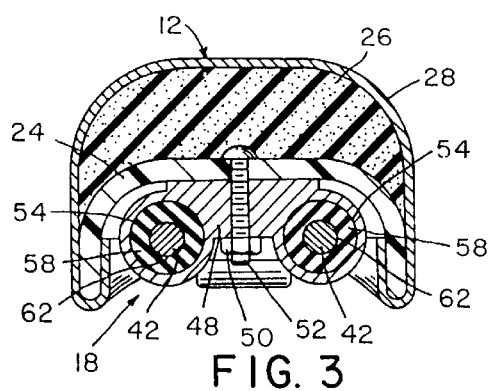
FIG. 3 is a cross-sectional view taken along line 3—3 of FIG. 2.
Figure 4:
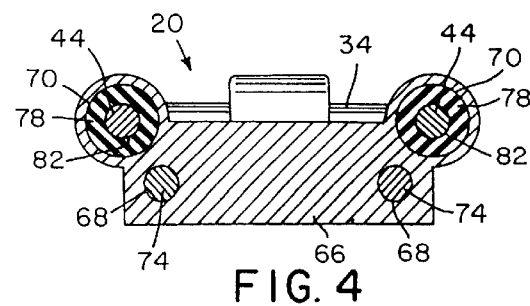
FIG. 4 is a cross-sectional view taken along line 4—4 of FIG. 2.

Referring now to FIGS. 1–4, a bicycle saddle in accordance with the present invention is shown at 10. The saddle 10 includes a resilient seat 12 having a longitudinal axis A for engaging the crotch of a user and a frame 14 for attaching the seat 12 to a conventional seat post of a bicycle (not shown). The frame 14 has a support member 16 which resembles an elongated loop when viewed from below. The upper, front end of the support member 16 is secured through a shock dampener 18 to the front of the seat 12. The lower, rear end of the support member 16 is secured through another shock dampener 20 to a seat post attachment bracket 22.

The seat 12 preferably has a composite construction. A stiff plastic former or shell 24 provides the seat 12 with its basic shape. The shell 24 is overlaid with a resilient foam pad 26 for user comfort. The pad 26, in turn, is covered by a protective layer 28 of leather or cloth to prevent tears in the pad 26 and reduce chafing of a user. The shell 24, pad 26 and protective layer 28 are secured together by adhesives or other suitable means.

The support member 16, like the seat 12, is built-up from a number of elements. Preferably, the support member 16 includes a pair of longitudinal arms 30 connected at their opposed ends by two lateral pins 32 and 34. Registered apertures, such as those indicated at 36 and 38, are provided in the arms 30 and the pins 32 and 34 for threadably receiving bolts 40. When tightened, the bolts 40 draw the pins 32 and 34 against the ends of the arms 30 to connect such together. Lock washers (not shown) may be positioned on the bolts 40 to aid in preventing their unintended turning after tightening has been accomplished.

Each of the arms 30 and the pins 32 and 34 is respectively formed from a single piece of stiff wire. Preferably, each of the pins 32 and 34 is straight. Each of the arms 30, however, is bent and has substantially parallel forward and rearward portions 42 and 44 joined together by a downwardly-sloping intermediate portion 46. The intermediate portions 46 of the arms 30 serve to distance the shock dampener 20 from the bottom of the seat 12.

The shock dampener 18 includes a rigid housing 48 secured by means of a nut 50 and bolt 52 to the shell 24. The housing 48 is provided with a socket 54 in each of its opposite sides and a socket 56 in its front end whereby the longitudinal axes of the sockets 54 and 56 intersect to form a C-shape. As shown, the opposite ends of the sockets 54 and 56 are open for access thereto.

Snugly positioned within the sockets 54 and 56 are cushioning blocks 58 and 60 comprising hollow cylinders of rubber or other resilient material. The blocks 58 have central passageways 62, with longitudinal axes B positioned parallel to longitudinal axis A, for snugly receiving the forward portions 42 of the arms 30. The block 60 also has a central passageway 64, with a longitudinal axis C positioned perpendicular to longitudinal axis A, for snugly receiving the pin 32. With the forward portions 42 of the arms 30 and the pin 32 surrounded by the blocks 58 and 60, the support member 16 is effectively prevented from contacting the housing 48 during use of the saddle 10.

The shock dampener 20 also includes a rigid housing 66. The front end of the housing 66 is provided with a pair of laterally-spaced bores 68. Above the bores 68, the housing 66 is provided with a pair of sockets 70 respectively located in each of its opposite sides. The rear end of the housing 66 has a socket 72 whose longitudinal axis intersects the longitudinal axes of the sockets 70 to form a C-shape. The opposite ends of the sockets 70 and 72 are open for access thereto.

The seat post attachment bracket 22 is secured to the housing 66 of the shock dampener 20. The bracket 22 is formed from a single piece of stiff wire which has been bent into a U-shape so as to include a pair of side rails 74 connected by a relatively-short front rail 76. The free ends of the side rails 74 are inserted into the laterally-spaced bores 68 in the housing 66 and secured there by welds or any other suitable means.

The dimensions of the bracket 22 may be varied. Nonetheless, the side rails 74 should be spaced from one another at a distance which permits their ready attachment to a conventional seat post. Further, the length of the side rails 74 should be adequate to permit fore and aft movement of the saddle 10 on a seat post to compensate for the particularities of various users.

Snugly positioned within the sockets 70 and 72 are cushioning blocks 78 and 80 which are identical to the cushioning blocks 58 and 60. The blocks 78 have central passageways 82, with longitudinal axes D positioned parallel to longitudinal axis A, for snugly receiving the rearward portions 44 of the arms 30. The block 80, on the other hand, has a central passageway 84, with a longitudinal axis E perpendicular to the longitudinal axis A, for snugly receiving the pin 34. The rearward portions 44 of the arms 30 and the pin 34, being surrounded by the blocks 78 and 80, are effectively prevented from contacting the housing 66 during use of the saddle 10.

After installing the saddle 10 upon a bicycle in the usual manner, the saddle 10 is ready for use. When encountering any roadway bumps, the weight of a rider will cause the frame 14 to deform slightly to the broken line position shown in FIG. 2 thereby absorbing the shock. It should be apparent that the rubber, cushioning blocks 58, 60, 78 and 80 permit this deformation to occur. The cushioning blocks 58, 60, 78 and 80 also serve as dampeners to prevent oscillations of the seat 12 when the frame 14 returns to its undeformed position.

By properly selecting the resiliency of the material used to form the cushioning blocks 58, 60, 78 and 80, the top of the seat 12 can be maintained substantially horizontal (or at any desired inclination) as the frame 14 is deformed regardless of the weight of a user. A heavier user may prefer cushioning blocks formed from very dense rubber to limit deformation of the frame 14 whereas a light rider may prefer a less dense material for a smoother ride.

Although the blocks 58, 60, 78 and 80 are snugly positioned in sockets 54, 56, 70 and 72, they may be removed and replaced with ones of another density by simply unscrewing bolts 40 to disassemble the support member 16. With the pins 32 and 34 separated from the longitudinal arms 30, the blocks 58, 60, 78 and 80 may be pulled from their sockets. New blocks 58, 60, 78 and 80 are installed by reversing the steps required for removal.

Figure 5:
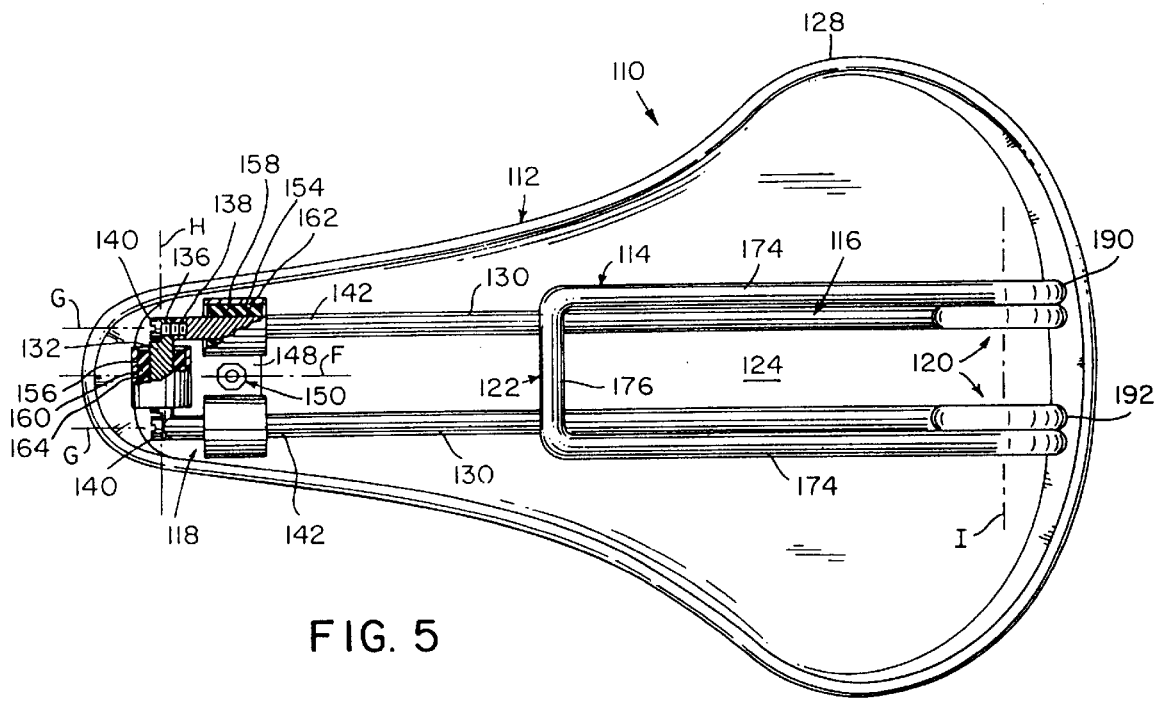
FIG. 5 is a bottom view of an alternative saddle in accordance with the invention.
Figure 6:
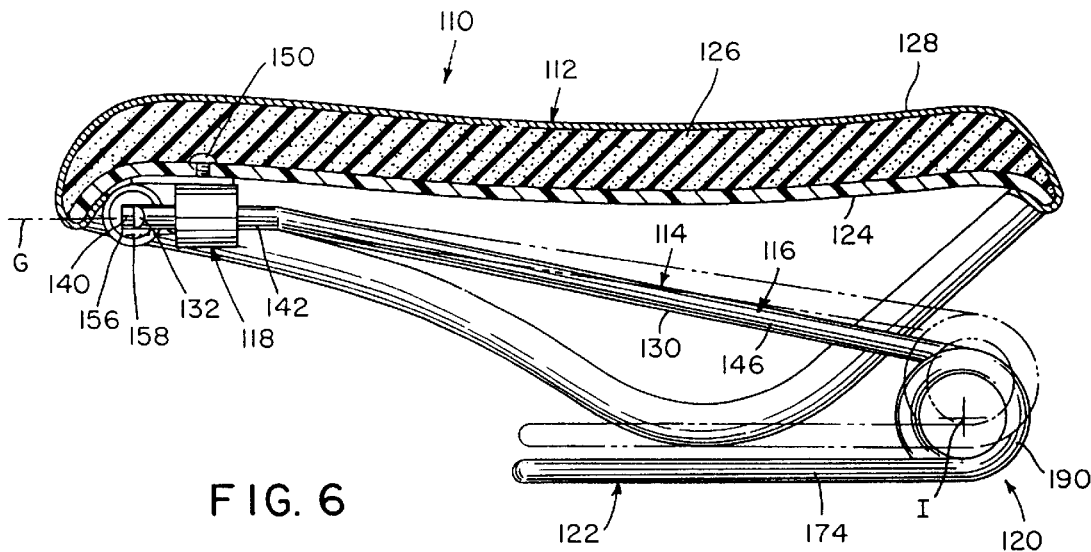
FIG. 6 is a side view of the bicycle saddle of FIG. 5 with portions broken away to reveal details thereof.

Referring now to FIGS. 5 and 6, an alternative saddle is illustrated generally at 110. As may be seen, the saddle 110 includes elements that correspond generally to those of the saddle 10 described above. The description of these corresponding elements will not be belabored below. Loops 190 and 192, however, have been exchanged for the shock dampener 20 and how this is accomplished will be emphasized.

The alternative saddle 110 includes a seat 112 having longitudinal axis F and a stiff shell 124 overlaid by a foam pad 126 and a protective layer 128. A frame 114 is secured to the seat 112 for attaching such to a bicycle seat post (not shown). The frame 114 has a support member 116 which is secured through a first shock dampener 118 to the front of the seat 112. The support member 116 is also integrally joined through a second shock dampener 120, in the form of loops 190 and 192, to a seat post attachment bracket 122.

The support member 116 includes a pair of longitudinal arms 130 connected at their front ends by a lateral pin 132. Registered apertures 136 and 138 are provided in the arms 130 and the pin 132 for threadably receiving bolts 140 which serve to connect the arms 130 and pin 132 together.

The arms 130 and the pin 132 are formed from stiff wire. The pin 132 has no bends. The arms 130 are bent, however, and have forward portions 142 with downwardly-sloping intermediate portions 146 extending therefrom. The intermediate portions 146 of the arms 130 serve to distance the shock dampener 120 from the bottom of the seat 112.

The shock dampener 118 includes a housing 148 secured by means of a threaded fastener 150 to the shell 124. The housing 148 is provided with a socket 154 in each of its opposite sides and a socket 156 in its front end whereby the longitudinal axes of the sockets 154 and 156 intersect to form a C-shape. The ends of the sockets 154 and 156 are open for access thereto.

Snugly positioned within the sockets 154 and 156 are cushioning blocks 158 and 160. The blocks 158 have central passageways 162, with longitudinal axes G parallel to longitudinal axis F, for snugly receiving the forward portions 142 of the arms 130. The block 160 also has a central passageway 164, with a longitudinal axis H perpendicular to longitudinal axis F, for snugly receiving the pin 132.

The shock dampener 120 comprises a pair of loops 190 and 192 each being integrally formed of stiff wire with the lower end of an intermediate portion 146 of a respective one of the arms 130. The loops 190 and 192 are coiled side-by-side around a common horizontal axis I perpendicular to longitudinal axis F thereby forming shock-absorbing springs. The lower ends of the loops 190 and 192 extend forwardly toward the front of the seat 112 and beneath the intermediate portions 146 of the arms 130.

The seat post attachment bracket 122 is formed of stiff wire and is fastened to the lower ends of the loops 190 and 192. The bracket 122 has a U-shape and includes a pair of side rails 174 connected together by a front rail 176. The side rails 174 are integrally fastened to both the front rail 176 and the loops 190 and 192 at their respective front and rear ends.

Use of the saddle 110 is substantially identical to that of saddle 10 described hereinabove. Means for adjusting the shock absorbing characteristics of the saddle 110, however, are somewhat more limited. The stiffness of the wire used to form the loops 190 and 192 as well as the resiliency of the material used to form the cushioning blocks 158 and 160 may be varied and are, of course, most important in this regard.

From the foregoing, it should be apparent that the present invention provides a bicycle saddle that will absorb road shocks without oscillation and without deviating from a preselected inclination during use. It should be noted also that the invention provides a saddle whose ability to absorb road shocks may be adjusted to suit the weight of a user. Thus, the present invention contributes substantially to improving the comfort level of a user while also improving his peddling efficiency.

While the invention has been described with a high degree of particularity, it will be appreciated by those skilled in the art that modifications may be made thereto. Therefore, it is to be understood that the present invention is not limited to the embodiments described above, but encompasses any and all embodiments within the scope of the following claims.

I claim:

1. A bicycle saddle, comprising:
    a seat having a longitudinal axis, a front end and a rear end;
    a first shock dampener secured to said front end of said seat, said first shock dampener including:
        a first housing; and,
        a plurality of first cushioning blocks secured within said first housing, each of said first cushioning blocks having a first passageway having a longitudinal axis oriented in a substantially horizontal plane, the longitudinal axis of at least one said first passageway being oriented substantially parallel with said longitudinal axis of said seat, the longitudinal axis of another said first passageway being oriented substantially perpendicular to said longitudinal axis of said seat;
    a support member having a front end and a rear end, said front end of said support member being secured within said first passageways of said first cushioning blocks; and,
    means for attaching said rear end of said support member to a bicycle seat post.

2. The bicycle saddle according to claim 1 wherein said attaching means include:
    a second shock dampener secured to said rear end of said support member, said second shock dampener including:
        a second housing; and,
        a plurality of second cushioning blocks secured within said second housing, each of said second cushioning blocks having a second passageway oriented in a substantially horizontal plane, the longitudinal axis of at least one said second passageway being oriented substantially parallel with said longitudinal axis of said seat, the longitudinal axis of another said second passageway being oriented substantially perpendicular to said longitudinal axis of said seat; and,
    a seat post attachment bracket secured to said second housing.

3. The bicycle saddle according to claim 2 wherein said seat post attachment bracket extends from said second housing beneath said support member.

4. The bicycle saddle according to claim 2 wherein said support member includes:
    a longitudinal arm having forward and rearward portions, said forward portion being disposed within one of said first passageways oriented substantially parallel with said longitudinal axis of said seat, said rearward portion being disposed within one of said second passageways oriented substantially parallel with said longitudinal axis of said seat;
    a first lateral pin extending at substantially right angles from said forward portion of said longitudinal arm, said first lateral pin being disposed within one of said first passageways oriented substantially perpendicular to said longitudinal axis of said seat; and,
    a second lateral pin extending at substantially right angles from said rearward portion of said longitudinal arm, said second lateral pin being disposed within one of said second passageways oriented substantially perpendicular to said longitudinal axis of said seat.

5. The bicycle saddle according to claim 4 wherein said longitudinal arm and said lateral pins are secured together by threaded fasteners.

6. The bicycle saddle according to claim 1 wherein said attaching means include:
    a pair of stiff wire loops integrally formed with said rear end of said support member, said loops being positioned side-by-side and coiled around a common horizontal axis; and,
    a seat post attachment bracket integrally formed with said loops and extending therefrom.

7. The bicycle saddle according to claim 6 wherein said seat post attachment bracket extends from said loops beneath said support member.

8. A bicycle saddle, comprising:
    a seat for supporting a user, said seat having opposed, first and second ends;
    a first housing secured to said first end of said seat;
    a plurality of first cushioning blocks secured within said first housing, each of said first cushioning blocks being a hollow, rubber cylinder with a first passageway oriented in a horizontal plane;
    a second housing spaced below said second end of said seat;
    a plurality of second cushioning blocks secured within said second housing, each of said second cushioning blocks being a hollow, rubber cylinder with a second passageway oriented in a horizontal plane;
    a support member having an upper end secured within said first passageways and a lower end secured within said second passageways; and,
    a seat post attachment bracket secured to said second housing.

9. The bicycle saddle according to claim 8 wherein said first end of said seat is relatively narrower than said second end of said seat.

10. The bicycle saddle according to claim 9 wherein said seat post attachment bracket extends from said second housing beneath said support member.

11. The bicycle saddle according to claim 9 wherein:
    each of said first passageways and longitudinal axes of said first passageways are arranged in a C-shape, opening toward said second end of said seat;
    each of said second passageways and longitudinal axes of said second passageways are arranged in a C-shape, opening toward said first end of said seat; and,
    said support member is a closed loop.

12. The bicycle saddle according to claim 11 wherein said support member includes:
    a pair longitudinal arms each having upper and lower ends;
    a first lateral pin connecting said upper ends of said longitudinal arms together;
    a second lateral pin connecting said lower ends of said longitudinal arms together; and,
    a plurality of threaded fasteners for securing said first and second lateral pins to said longitudinal arms.

13. A bicycle saddle, comprising:
    a seat having a longitudinal axis, a front end and a rear end;

a shock dampener secured to said front end of said seat, said shock dampener including:
  a housing; and,
  a plurality of cushioning blocks secured within said housing, each of said cushioning blocks having a passageway oriented in a substantially horizontal plane, the longitudinal axis of at least one said passageway being oriented substantially parallel to said longitudinal axis of said seat, the longitudinal axis of another said passageway being oriented substantially perpendicular to said longitudinal axis of said seat;

a support member having a front end and a rear end, said front end of said support member being secured within said passageways of said cushioning blocks;

a pair of loops integrally formed with said rear end of said support member, said loops being positioned side-by-side and coiled around a common horizontal axis; and, a seat post attachment bracket integrally formed with said loops and extending therefrom.

14. The bicycle saddle according to claim 13 wherein said seat post attachment bracket extends from said loops beneath said support member.

15. The bicycle saddle according to claim 13 wherein said support member includes:

a longitudinal arm having forward and rearward portions, said forward portion being disposed within one of said passageways oriented substantially parallel to said longitudinal axis of said seat; and, a lateral pin extending at substantially right angles from said forward portion of said longitudinal arm, said lateral pin being disposed within one of said passageways oriented substantially perpendicular to said longitudinal axis of said seat.

16. The bicycle saddle according to claim 15 wherein said longitudinal arm and said lateral pin are secured together by threaded fasteners.

* * * * *